United States Patent [19]

Burnham

[11] Patent Number: 4,612,001
[45] Date of Patent: Sep. 16, 1986

[54] GAME CALL

[75] Inventor: Murry Burnham, Marble Falls, Tex.

[73] Assignee: Burnham Bros., Marble Falls, Tex.

[21] Appl. No.: 675,447

[22] Filed: Nov. 28, 1984

[51] Int. Cl.$^4$ .............................................. A63H 5/00
[52] U.S. Cl. ................................... 446/208; 446/216; 84/350; 84/363
[58] Field of Search .............................. 446/202–209, 446/213, 216, 416, 397; 84/375, 383 A, 351, 350, 363

[56] References Cited

U.S. PATENT DOCUMENTS

| | | | |
|---|---|---|---|
| 547,100 | 10/1895 | White | 446/205 |
| 580,649 | 4/1897 | Rauner | 84/375 |
| 2,833,085 | 5/1958 | Wintriss | 46/117 |
| 2,835,077 | 5/1958 | Mittelsteadt | 46/180 |
| 3,001,322 | 9/1961 | Sanders | 46/180 |
| 3,054,216 | 9/1962 | Testo | 446/208 |
| 3,406,479 | 10/1968 | Faulk | 46/180 |
| 3,466,794 | 9/1969 | Pritchard et al. | 446/207 |
| 3,928,935 | 12/1975 | Beadles, Jr. | 446/208 |
| 3,955,313 | 5/1976 | Faulk | 46/178 |
| 3,991,513 | 11/1976 | Faulk | 446/208 |
| 4,207,703 | 6/1980 | Saso | 446/205 |
| 4,211,031 | 7/1980 | Gambino | 46/177 |

Primary Examiner—Robert A. Hafer
Assistant Examiner—Terrence L. B. Brown
Attorney, Agent, or Firm—Arnold, White & Durkee

[57] ABSTRACT

A double reed game call is provided in which the reeds are aligned in series and are actuated simultaneously by an airstream. The call includes a barrel, a first keg and a second keg which are positioned in series. Each keg includes a reed assembly which is air actuated. The kegs are interchangeable to produce differing sounds.

1 Claim, 3 Drawing Figures

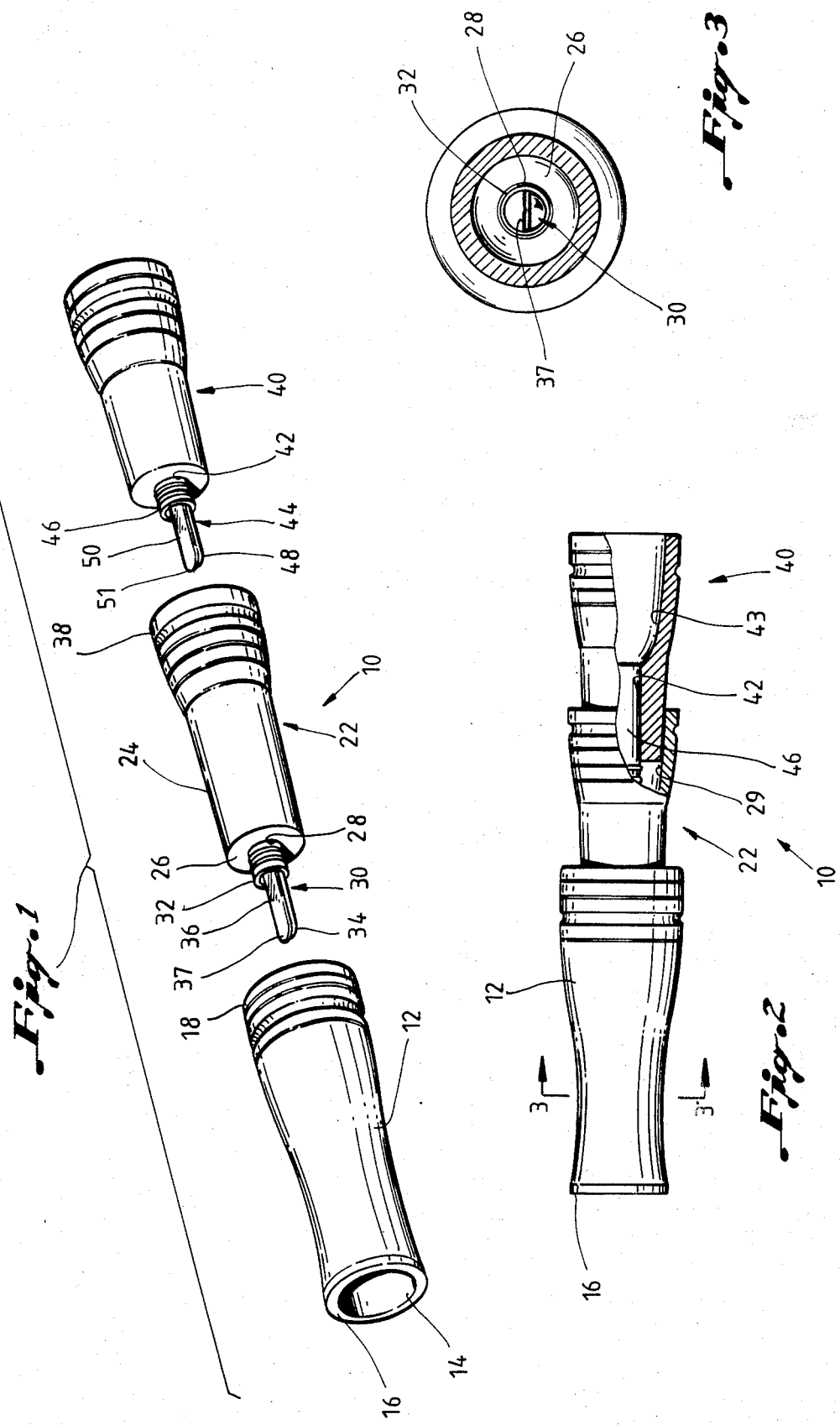

GAME CALL

BACKGROUND

The present invention relates to animal calls having air actuated reed assemblies and, more particularly, is directed to a call having a double reed assembly.

Many different types of devices have been developed for mimicking the sounds of birds, predators, and other animals. Generally, these calls are used by hunters to lure game into the open where they can be seen. One of the most common types of devices for calling birds and predators comprises a small hand held device having a reed assembly therein which is actuated by blowing air through the device. Many different reed and body configurations have been developed to produce different sounding calls. Many of these calls are adjustable such that the pitch can be varied to mimic different types of animals. However, these adjustments are often difficult to make.

Because of the increased use of calls, the large predators such as the coyote and bobcat have become spookier and more suspicious of the sounds made by currently available calls. Accordingly, it would be an advancement in the art to provide a new call for predators and other types of game animals having a unique sound. It would also be advantageous to provide such a call which was easy to use and did not require complicated adjustments by the user. Such a device is disclosed and claimed herein.

SUMMARY OF THE INVENTION

The present invention provides a call having a double reed system which produces a unique sound for calling game animals and in particular for calling predators. The call includes a barrel section having a bore extending longitudinally therethrough so as to define an air passageway. One end of the barrel defines a mouthpiece for introducing a stream of air into the call.

A first interchangeable keg is positioned in the end of the barrel opposite the mouthpiece. The keg has a tapered body such that it can be inserted into the end of the barrel in press fit relationship. The keg includes a longitudinal bore extending therethrough which, in the preferred embodiment, is co-axial with the longitudinal bore in the barrel. A reed assembly is positioned in an end of the first keg such that it is positioned in the air passageway defined by the longitudinal bores.

A second interchangeable keg is positioned in an end of said first keg opposite the reed assembly. The second keg also has a tapered body such that it can be inserted into the first keg in press fit relationship. The second keg includes a longitudinal bore in alignment with the longitudinal bores of the first keg and barrel and a reed assembly is positioned in an end of the second keg which is inserted into the first keg. Accordingly, the two reed assemblies in the call are positioned in series and are actuated simultaneously as a stream of air passes through the call.

BRIEF DESCRIPTION OF THE DRAWINGS

Reference is next made to the drawings in which:

FIG. 1 is an exploded perspective view of a preferred embodiment of the game call of the present invention;

FIG. 2 is a partially broken away side elevational view of the preferred embodiment of the game call; and FIG. 3 is a cross-sectional view of the game call taken along line 3—3 of FIG. 2.

DETAILED DESCRIPTION OF THE PREFERRED EMBODIMENTS

The present invention is directed to a unique double reed game call which is especially adapted for calling predators. The game call includes two reed assemblies which are aligned in series and are actuated simultaneously by a stream of air passing through the call. While the call is especially suitable for calling large predators, it will be appreciated by those skilled in the art that the present invention can be modified by adjusting the size and pitch of the reeds so as to produce sounds suitable for calling other types of game animals.

The invention is best understood by reference to the drawings in which like parts are designated with like numerals throughout. Referring first to FIG. 1, the game call, generally designated at 10, is illustrated in an exploded perspective view. Call 10 includes a barrel 12 which is generally cylindrical in shape and has a longitudinal bore 14 extending through the length thereof. A first end 16 of barrel 12 defines a mouthpiece through which a stream of air can be introduced into call 10.

A first keg 22 is designed to be inserted into a second end 18 of barrel 12. Keg 22 has a generally cylindrical body 24 which is slightly tapered at a first end 26 such that it can easily be inserted into bore 14 of barrel 12 and remain in place in a press fit relationship.

Keg 22 includes a cylindrical bore 28 extending through the length of the keg. In the preferred embodiment, bore 28 is in axial alignment with bore 14 in barrel 12. Accordingly, bores 14 and 28 form a single air passageway. A reed assembly 30 is positioned in bore 28 in the first end 26 of keg 22. Reed assembly 30 includes a cylindrical sleeve which is snugly positioned within bore 28. A channel member 34 is positioned within sleeve 32 and a reed 36 is positioned on top of channel 34 such that its free end 37 can vibrate as air passes through the passageway defined by bores 14 and 28. The portion 29 of bore 28 downstream of reed assembly 30 forms a sound chamber for developing the sound produced by reed 36.

First keg 22 includes a flared second end 38 which is designed to receive a second keg 40 in press fit relationship. The second keg 40 is similar in configuration to the first keg 22 but, in the preferred embodiment, is slightly shorter in length. Keg 40 includes a longitudinal bore 42 which extends through the length thereof. Bore 42 is in axial alignment with bores 14 and 28 to form a continuous air passageway.

A reed assembly 44 is positioned in keg 40 in a first end 41 which is inserted into keg 22. Reed assembly 44 includes a cylindrical sleeve 46 which fits snugly within bore 42. A channel member 48 is positioned within sleeve 46 and a vibrating reed 50 is positioned above channel 48 such that its free end 51 can vibrate as air passes through the passageway.

Reed assemblies 30 and 44 are positioned in series such that they are actuated simultaneously by air passing through call 10. The portion 43 of bore 42 downstream of reed assembly 44 forms a second sound chamber for developing the sounds produced by the reed assemblies. This alignment produces a unique sound useful in calling game animals. In the preferred embodiment, reed assemblies 30 and 44 are tuned the same. However, it will be appreciated that they could also be tuned differently.

Because of the shorter length of keg 40, the sound chamber formed by bore 42 produces a different sound than that produced in keg 22. Accordingly, the overall sound of the call can be changed by reversing the order of kegs 22 and 40 or by substituting kegs of differing sizes.

In the preferred embodiment, barrel 12 and kegs 22 and 40 are formed from walnut. However, it will be appreciated by those skilled in the art that other types of wood and other materials such as plastic and metal could also be utilized in the present invention. The reeds in the preferred embodiment are constructed from metal. However, other materials well known to those skilled in the art could also be used.

The double reed system of the present invention wherein the reeds are arranged in series such that they are actuated simultaneously by a single stream of air passing through the call produces a unique sound suitable for calling predators and other animals. While the invention has been described with respect to the presently preferred embodiment, it will be appreciated by those skilled in the art that modifications and changes could be made to the illustrated embodiment without departing from the spirit of the invention. For example, the relative lengths of the kegs and sound chambers could be varied as well as the exact configuration of the reed assemblies. Accordingly, the scope of the invention is to be determined by the following claims rather than by the foregoing description. All modifications or changes which come within the meaning and range of equivalency of the claims are to be embraced within their scope.

What is claimed is:

1. A game call comprising:

a barrel having a longitudinal bore extending therethrough defining an air passageway, a first end of said barrel defining a mouthpiece for introduction of air into said air passageway;

a first key disposed in an end of said barrel opposite said mouthpiece, said first keg having a bore extending therethrough so as to define an air passageway in communication with the air passageway in said barrel, said first keg including a reed assembly positioned in said air passageway and adapted to be actuated by an air stream; and a second keg disposed in a free end of said first keg, said second keg having a length different than the length of said first keg, said first and second kegs being interchangeable, said second keg also having a bore extending therethrough so as to define an air passageway in communication with the air passageway in said first keg, said second keg including a reed assembly positioned in said air passageway and adapted to be actuated by an air stream.

* * * * *